(No Model.)
J. J. PHILLIPS.
MACHINE FOR WASHING NUTS.
No. 410,016. Patented Aug. 27, 1889.
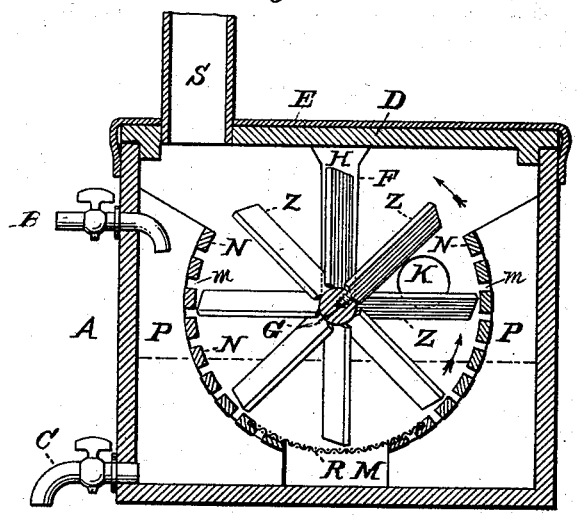
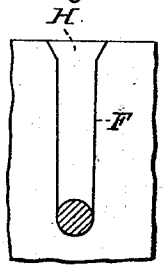
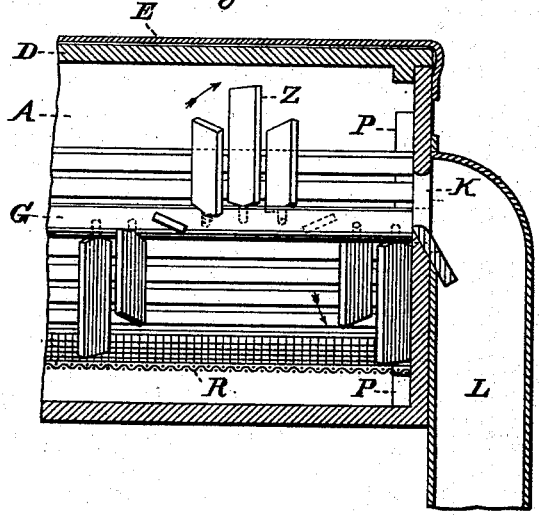
WITNESSES
Villette Anderson,
Mary Baykur
INVENTOR
James J. Phillips
by E. W. Anderson
his Attorney

UNITED STATES PATENT OFFICE.

JAMES J. PHILLIPS, OF NORFOLK, VIRGINIA.

MACHINE FOR WASHING NUTS.

SPECIFICATION forming part of Letters Patent No. 410,016, dated August 27, 1889.

Application filed November 12, 1888. Serial No. 290,587. (No model.)

*To all whom it may concern:*

Be it known that I, JAMES J. PHILLIPS, a citizen of the United States, and a resident of Norfolk, in the county of Norfolk and State of Virginia, have invented certain new and useful Improvements in Machines for Washing Nuts, &c.; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a transverse section of the washer. Fig. 2 is a partial longitudinal section of the same. Fig. 3 is a detail.

This invention has relation to means for washing nuts; and it consists in the construction and novel combination of devices, as hereinafter set forth, and pointed out in the appended claims.

The object of the invention is to provide apparatus adapted to contain a chemical bath and to receive the nuts to be treated therein, to turn the nuts in the bath, and finally to discharge the nuts in a gradual and uniform manner.

In the accompanying drawings, the letter A designates a tank, into which water may be poured according to requirement from a faucet B.

C is an outlet-faucet for the waste.

D is a lid adapted to fit the top of the tank closely, and usually provided with a cover of oil-cloth or rubber-cloth, as indicated at E, to prevent gases from passing into or out of the tank. At each end the tank is formed with a vertical slot-bearing F, for the journal of the rotary agitator G. The slot-bearing F is designed to be closed after the shaft is placed in position by means of the stops H.

In the end of the tank, above the water-level therein, is provided the discharge-opening K, said discharge-opening usually leading into a chute or spout L, turned downward.

In the tank is provided a concave false bottom to bring the nuts to be operated on within the range of the action of the agitator-blades, hereinafter referred to. Concave slat-racks N N, supported by corner pieces or knees P, extend along each side of the tank, intervals *m* being usually provided between these racks and being covered by perforated metal or wire cloth. A removable wire-covered bridge R M is also provided in said concave bottom for the ready removal of the sediment or foreign substances settling in the chamber bound by the concave bottom. The racks and perforated bottoms as well as the agitator are made removable, because the nuts in becoming cleansed leave the bath very foul, and it requires frequent and thorough cleansing. The nuts are deposited in the tank through a hopper or chute, usually at S, and being received in the bath are agitated therein by the rotary movement of the paddle-shaft G, and are thereby gradually moved toward the discharging end of the tank. As they become massed at the discharging end, the floating nuts being carried upward above the level of the liquid in the tank are automatically discharged through the opening K.

The agitator G is preferably made with paddles Z, which are inclined, and these paddles are usually formed with threaded ends engaging perforations in the shaft, so that they can be adapted to any angle of inclination desired, some nuts requiring to be fed slowly through the liquid and slowly discharged, while others can be more rapidly operated. Sometimes it may be preferred to alter the speed of the paddle-shaft to effect a change in the rapidity of discharge. So, also, the rate of discharge may be regulated by the height of the liquid in the tank, the level of the surface thereof approximating more or less the lower edge of the discharge-opening K.

The chemicals employed in the bath give rise to gases which are not pleasant to inhale, and it is important to keep the tank closed on this account, and also because, if allowed to escape, there is a certain loss of chemical action, and, furthermore, in order to secure the full strength of the bath it is desirable to exclude from the tank other gases exterior thereto.

The bath is usually prepared by placing the chemicals in the tank upon the slats and perforated bottom and then filling the tank with water to the height desired. The coarser dirt from the nuts sinks in the form of sediment through the slats and perforated bottom, and lying below these parts is not liable to become applied to the nuts, as they move in the clearer liquid above. In their passage from one end to the other of the tank the nuts becoming cleansed are automatically raised and discharged through the opening K, while the liquid of the bath is retained.

Having described this invention, what I claim, and desire to secure by Letters Patent, is—

1. The combination, with the end-slotted tank having an end discharge-opening, of the rotary agitator having its shaft at one end let into the slot in the end of the tank and provided with oblique or inclined radial blades, an auxiliary concave bottom formed of spaced apart slats, and a removable wire-covered bridge-bottom, substantially as set forth.

2. The combination, with the end-slotted tank having an end discharge-opening, an auxiliary concave bottom formed of spaced apart slats and a removable wire-covered bridge-bottom, of the rotary agitator having one end of its shaft let into the slot of said tank and provided with oblique or inclined radial wings or blades, said tank also having a discharge-opening above the water-level and an inlet and outlet water-cock, substantially as specified.

In testimony whereof I affix my signature in presence of two witnesses.

JAMES J. PHILLIPS.

Witnesses:
 VILLETTE ANDERSON,
 MARY BOYKIN.